Figure 3:
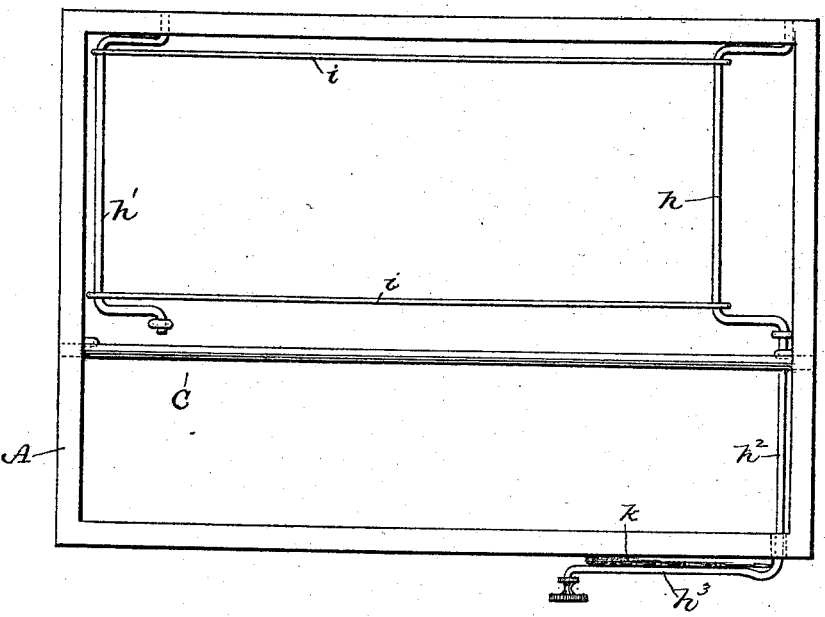

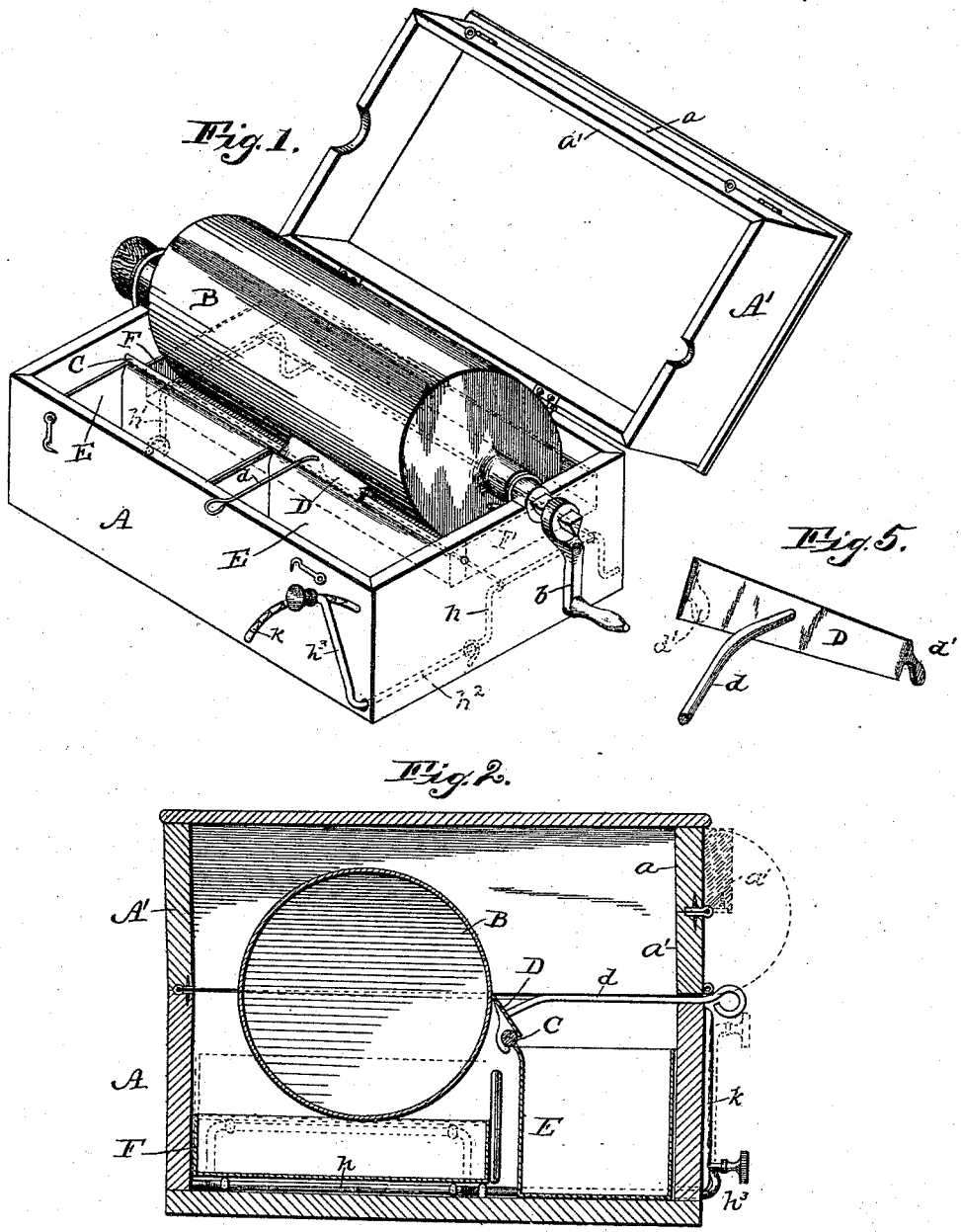

(No Model.)  2 Sheets—Sheet 2.

J. HEBERLING.
ICE CREAM FREEZER.

No. 470,360.  Patented Mar. 8, 1892.

Witnesses:
O. V. Cushman.
C. M. Sweeney.

Inventor:
John Heberling
by Macleod, Calver & Randall,
Attorneys.

UNITED STATES PATENT OFFICE.

JOHN HEBERLING, OF ROCHESTER, ASSIGNOR OF ONE-HALF TO H. S. SOUTHWORTH, OF BINGHAMTON, NEW YORK.

ICE-CREAM FREEZER.

SPECIFICATION forming part of Letters Patent No. 470,360, dated March 8, 1892.

Application filed August 4, 1891. Serial No. 401,641. (No model.)

*To all whom it may concern:*

Be it known that I, JOHN HEBERLING, a citizen of the United States, residing at Rochester, in the county of Monroe and State of New York, have invented certain new and useful Improvements in Ice-Cream Freezers, of which the following is a specification, reference being had therein to the accompanying drawings.

My invention relates to that class of freezers in which the refrigerating material is contained within a freezing-cylinder arranged to dip slightly into a pan containing the substance to be frozen, so that as said cylinder is rotated by the operator a film of frozen material will be gathered thereupon, this frozen film being removed from the cylinder by a scraper as the said cylinder is rotated.

In the class of freezers to which my invention relates it has heretofore been customary to provide a scraper which extends the entire length of the cylinder, so that the entire film of frozen material is removed at each rotation of the cylinder; but in thus removing such a large film of frozen material at one time considerable power is required to rotate the cylinder, and in order that the cylinder may be rotated with sufficient ease some machines of this class have been provided with gearing, which is objectionable in that it adds to the cost of construction and makes the freezer more difficult to clean. I obviate this objection by providing a scraper of much lesser length than the cylinder and which is supported adjacent thereto by a rod, on which it may be moved lengthwise of the cylinder. This scraper therefore removes but a portion of the frozen material at each rotation of the cylinder and is then moved along to remove another portion, and owing to the fact that but a portion of the frozen material is removed at each rotation of the cylinder the latter will be turned much more easily than with a scraper extending the entire length thereof. Thus if the scraper is but one-fourth or one-fifth the length of the cylinder only about one-fourth or one-fifth as much power will be required to rotate the said cylinder as would be necessary with a scraper extending the entire length thereof. The scraper is preferably constructed with an oblique scraping-edge, thus removing the frozen material with more ease and rendering it possible for the scraper to be moved automatically lengthwise of the cylinder by the pressure of the frozen material against the oblique edge thereof.

My invention also has for its object to provide a simply-constructed support for the cream-pan, by which the latter may be raised and lowered by the movement of a single adjusting-arm. To this end the pan-support consists of two pivoted crank-arms connected by rods, one of the said crank-arms being formed integral with a rod extending through the side of the box inclosing the freezer, where it is provided with an operating spring-handle engaging the teeth or notches of a segmental toothed or notched holder, which retains it in any position to which it may be adjusted. This construction of the adjustable support holds the cream-pan horizontal at all times and at all positions of adjustment and enables it to be raised and lowered simply by moving a single operating-handle.

Figure 4:
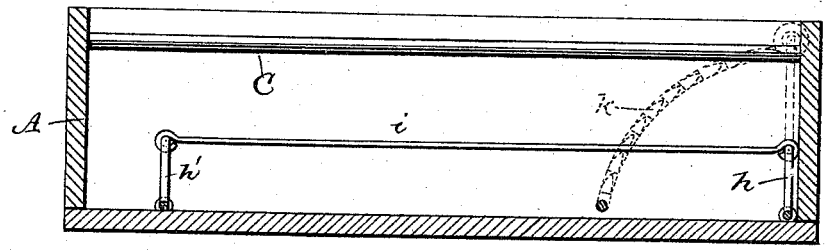

In the accompanying drawings, Figure 1 is a perspective view of my improved freezer, with the cover thereof open. Fig. 2 is a cross-section of the same, with the cover closed. Fig. 3 is a plan view of the lower portion of a freezer-containing box to show the adjustable support for the cream-pan, the freezing-cylinder and the receptacles for the frozen material being removed. Fig. 4 is a longitudinal section of the box, also to show the adjustable support for the cream-pan. Fig. 5 is a detail view of the scraper.

A denotes a suitable box provided with a cover A' and constructed to form bearings at its ends for the freezing-cylinder B of ordinary construction and containing the refrigerating material. Adjacent to and parallel with the said cylinder inside of the said box is a supporting-rod C, adapted to sustain a scraper D, provided with a handle d, resting on the front edge of the said box, the said scraper being also provided with rearwardly-turned ears or flanges d', having notches to receive the said rod, so that the said scraper may be firmly supported with its scraping-edge in contact with the said cylinder. The scraper is of lesser length than the cylinder, being preferably not more than one-third or one-fourth of the length thereof, so that only a portion of the frozen material is removed from the said cylinder at each rotation of the latter. The said scraper is also preferably formed with an inclined or oblique scraping-edge, and when thus constructed the pressure of the frozen material thereagainst as the freezing-cylinder is rotated will tend to automatically slide the said scraper lengthwise of the said cylinder on said rod, and when it arrives at the end of its travel it may be returned by the operator; but the movement of the scraper lengthwise of the cylinder may be effected by the operator, if desired, and in such instance the scraping-edge of the scraper might be parallel with the rod on which it slides.

Forward of the scraper in the box A are arranged one or more boxes E, which receive the frozen material as it is removed from the cylinder by the scraper. In the rear portion of the box A, beneath the cylinder B, is placed the cream-pan F, which is adjustable vertically, so that as the cream is taken up therefrom by the said cylinder said pan may be raised gradually as the cream lowers, thereby enabling the cylinder to have a uniform dip in the cream.

My improved adjustable support for the cream-pan consists of the crank-arms $h$ $h'$, connected by the longitudinal rods $i$, the crank-arm $h$ being formed integral with the rod $h^2$, extending forward through the box A, where it is provided with a spring arm or handle $h^3$, adapted to engage the teeth or notches of the segmental holding plate or bar $k$, secured to the front side of the said box. By moving the handle $h^3$ the connected crank-arms $h$ $h'$, on which the cream-pan rests, will be simultaneously moved, so that the cream-pan may be raised and lowered simply by moving said handle $h^3$, and the said pan will at all times be retained in a horizontal position parallel with the cylinder B.

From the foregoing it will be apparent that as the freezing-cylinder is rotated by its operating-crank $b$ the frozen film may be easily removed therefrom by the scraper D, and it will not require so much power to turn the said cylinder as has heretofore been required in freezers of this class which are not provided with gearing and it will also be apparent that the cream-pan may be adjusted to any position required simply by moving the single operating arm or handle $h^3$.

The front of the cover A' is preferably formed in two parts $a$ and $a'$, the latter being hinged to the former, so that it may be turned up, as denoted in dotted lines in Fig. 2, leaving a space through which the handle $d$ of the scraper D may project for convenience in operating and also through which the quantity and condition of the cream may be observed without too much exposure of the cylinder by opening or turning back the entire cover.

Having thus described my invention, I claim and desire to secure by Letters Patent—

1. The combination, with the freezing-cylinder B, of a scraper for removing the frozen material therefrom, and which said scraper, being movable lengthwise of said cylinder, is of lesser length than the said cylinder.

2. The combination, with the freezing-cylinder B, of a supporting-rod arranged adjacent to and parallel with the said cylinder and a scraper sustained by said rod and serving to remove the frozen film from the said cylinder, said scraper being of lesser length than the said cylinder and being movable lengthwise of said cylinder on said rod.

3. The combination, with the freezing-cylinder B, of a supporting-rod adjacent to and parallel with the said cylinder and a scraper sustained by said rod and having a scraping-edge which is oblique to the longitudinal axis of the said cylinder and of the said rod, said scraper being of lesser length than said cylinder and being movable lengthwise thereof on said rod.

4. In an ice-cream freezer, the combination, with the box A, of the pivoted crank-arms $h$ $h'$, the former being formed integral with the rod $h^2$, extending outward through said box and provided with a spring arm or handle $h^3$, the rods $i$, connecting said crank-arms, and a segmental notched or toothed holding plate or bar with which the said arm $h^3$ engages.

In testimony whereof I affix my signature in presence of two witnesses.

JOHN HEBERLING.

Witnesses:
JEROME DEWITT,
H. S. SOUTHWORTH.